(12) United States Patent
Nagashima

(10) Patent No.: US 10,241,501 B2
(45) Date of Patent: Mar. 26, 2019

(54) NUMERICAL CONTROLLER HAVING AUTOMATIC TRACE FUNCTION OF RELATED SIGNAL IN ASSOCIATION WITH NC PROGRAM OPERATION

(71) Applicant: FANUC CORPORATION, Minamitsuru-gun, Yamanashi (JP)

(72) Inventor: Noritake Nagashima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 189 days.

(21) Appl. No.: 15/266,253

(22) Filed: Sep. 15, 2016

(65) Prior Publication Data

US 2017/0075341 A1 Mar. 16, 2017

(30) Foreign Application Priority Data

Sep. 16, 2015 (JP) .................................. 2015-183430

(51) Int. Cl.
*G05B 19/414* (2006.01)

(52) U.S. Cl.
CPC ..... *G05B 19/4147* (2013.01); *G05B 19/4145* (2013.01); *G05B 2219/13037* (2013.01); *G05B 2219/33297* (2013.01); *G05B 2219/34273* (2013.01); *G05B 2219/34291* (2013.01); *G05B 2219/36038* (2013.01)

(58) Field of Classification Search
None
See application file for complete search history.

(56) References Cited

U.S. PATENT DOCUMENTS

| 4,510,565 A | * | 4/1985 | Dummermuth | .... G05B 19/4147 700/169 |
| 4,972,365 A | * | 11/1990 | Dodds | .................. G05B 19/054 700/7 |

(Continued)

FOREIGN PATENT DOCUMENTS

| CN | 101303584 A | 11/2008 |
| CN | 102591251 A | 7/2012 |

(Continued)

OTHER PUBLICATIONS

Notification of Reasons for Refusal for Japanese Application No. 2015-183430, dated Oct. 31, 2017, including English translation, 4 pages.

(Continued)

*Primary Examiner* — Isaac T Tecklu
(74) *Attorney, Agent, or Firm* — RatnerPrestia

(57) ABSTRACT

A numerical controller includes a programmable controller that performs input and output of a signal based on a ladder program and performs control of a machine based on an NC program. The numerical controller includes a first table associating the function used for control of the machine, an input signal, and an output signal and a second table associating the input signal, the output signal, and a signal in a dependent relation with the input signal and the output signal. Based on a function code of a function commanded by a block of the NC program that is preread, the numerical controller refers to the first and the second tables, identifies a signal to be subjected to automatic trace, and performs trace.

5 Claims, 7 Drawing Sheets

(56) References Cited

U.S. PATENT DOCUMENTS

| | | | | |
|---|---|---|---|---|
| 5,068,778 | A * | 11/1991 | Kosem | G05B 15/02 700/2 |
| 5,392,424 | A * | 2/1995 | Cook | G05B 19/058 714/49 |
| 6,076,020 | A * | 6/2000 | Schwenke | G05B 19/056 700/104 |
| 6,154,684 | A * | 11/2000 | Schwenke | G05B 19/056 700/159 |
| 7,272,450 | B2 * | 9/2007 | Inoue | G05B 19/0426 700/18 |
| 9,740,185 | B2 * | 8/2017 | Nakagawa | G05B 19/056 |
| 2007/0078538 | A1 * | 4/2007 | Kawakami | G06F 11/3648 700/87 |
| 2011/0270424 | A1 * | 11/2011 | Nakai | G06F 11/3604 700/87 |
| 2014/0304551 | A1 * | 10/2014 | Nakai | G06F 11/3692 714/38.1 |

FOREIGN PATENT DOCUMENTS

| | | |
|---|---|---|
| JP | H0784616 A | 3/1995 |
| JP | H07319517 A | 12/1995 |
| JP | H 10-293603 A | 11/1998 |
| JP | 2003202904 A | 7/2003 |
| JP | 2006092241 A | 4/2006 |
| JP | 5362148 | 9/2013 |
| SU | 1631726 A1 | 2/1991 |

OTHER PUBLICATIONS

Chinese Office Action for Chinese Application No. 2016108274653, dated Aug. 13, 2018, with translation, 12 pages.

* cited by examiner

FIG. 3

EXAMPLE OF NC FUNCTION
RELATED SIGNAL TABLE

220

| INTERPOLATION CODE, AUXILIARY CODE | OUTPUT SIGNAL | INPUT SIGNAL | REMARK |
|---|---|---|---|
| Gxxx | Fxxx.x | Gxxx.x | |
| G12.4 | F082.1 | G067.1 | FUNCTION: CONTINUOUS CIRCULAR MOTION MODE ON<br>OUTPUT: GROOVE MACHINING MODE ACTIVE SIGNAL<br>INPUT: GROOVE MACHINING MODE VALID SIGNAL |
| ... | ... | ... | |
| Mxx | Fxxx.x | Gxxx.x | |
| M02 | F009.5<br>F010.2<br>F007.2<br>F001.3 | G004.3 | FUNCTION: END OF PROGRAM<br>OUTPUT: DECODE SIGNAL<br>    CODE SIGNAL<br>    STROBE SIGNAL<br>    DISTRIBUTION COMPLETION SIGNAL<br>INPUT: COMPLETION SIGNAL |
| ... | ... | ... | |
| Sxx | Fxxx.x | Gxxx.x | |
| ... | ... | ... | |
| Txx | Fxxx.x | Gxxx.x | |
| ... | ... | ... | |

FIG. 4

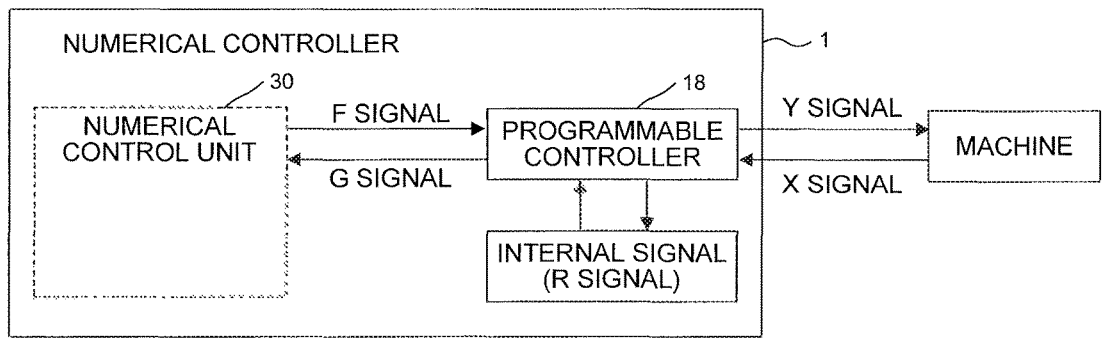

EXAMPLE OF NC FUNCTION
RELATED SIGNAL DATA OF G12.4

| FUNCTION CODE | CODE OUTPUT SIGNAL | CODE INPUT SIGNAL |
|---|---|---|
| G12.4 | F82.1 | G67.1 |

EXAMPLE OF LADDER PROGRAM

FIG. 6
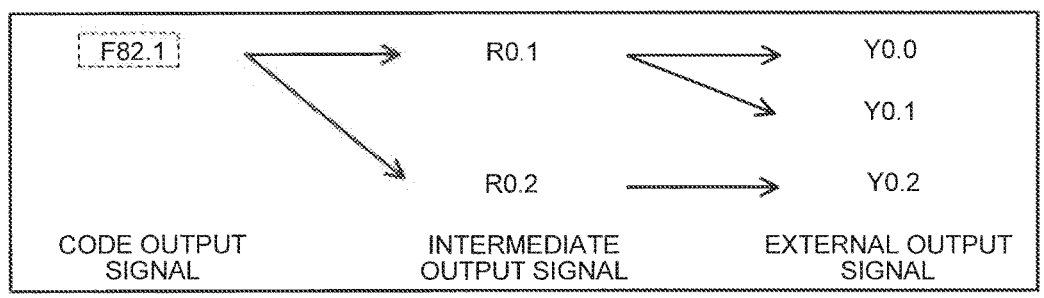
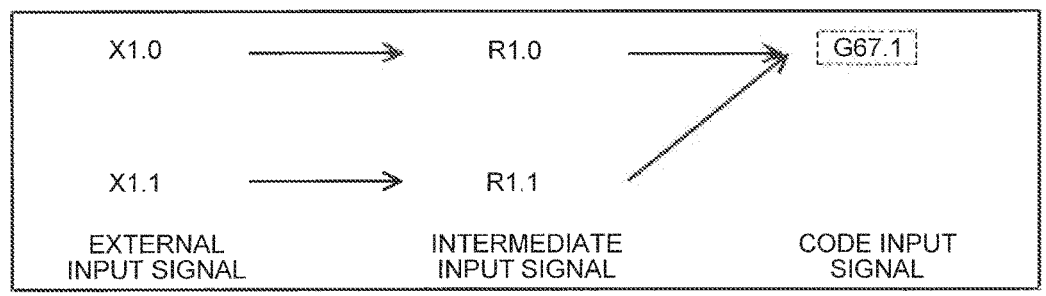
FIG. 7
EXAMPLE OF FUNCTIONAL SAMPLING
SIGNAL DATA OF G12.4
| CODE OUTPUT SIGNAL | INTERMEDIATE OUTPUT SIGNAL | EXTERNAL OUTPUT SIGNAL | CODE INPUT SIGNAL | INTERMEDIATE INPUT SIGNAL | EXTERNAL INPUT SIGNAL |
|---|---|---|---|---|---|
| F82.1 | R0.1<br>R0.2 | Y0.0<br>Y0.1<br>Y0.2 | G67.1 | R1.0<br>R1.1 | X1.0<br>X1.1 |

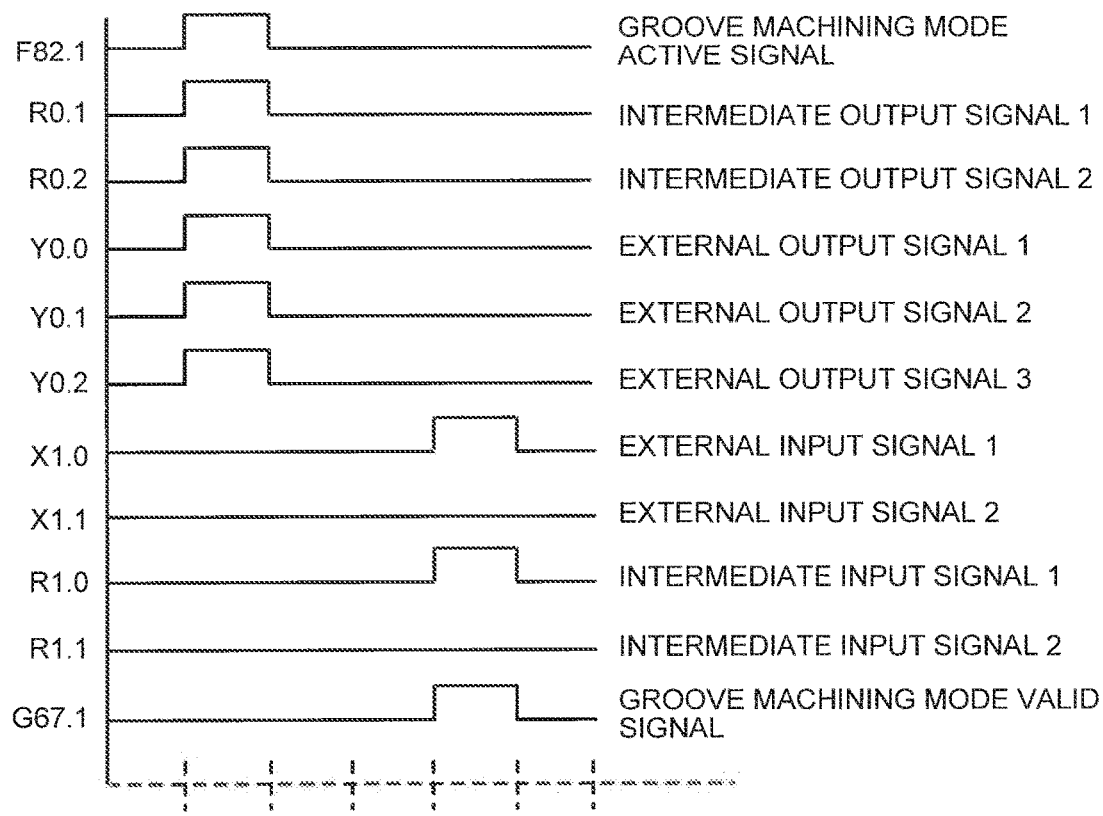
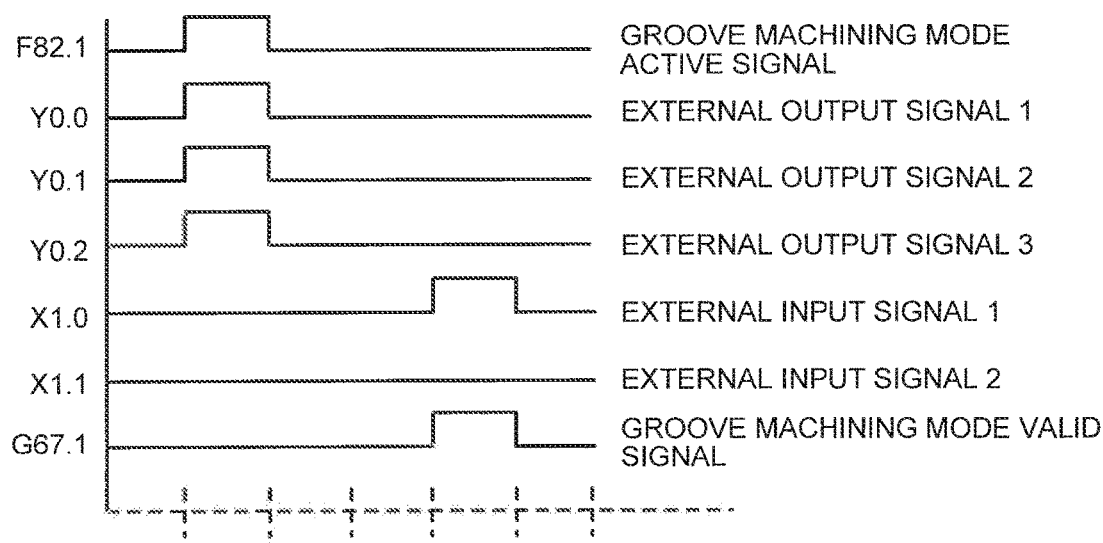

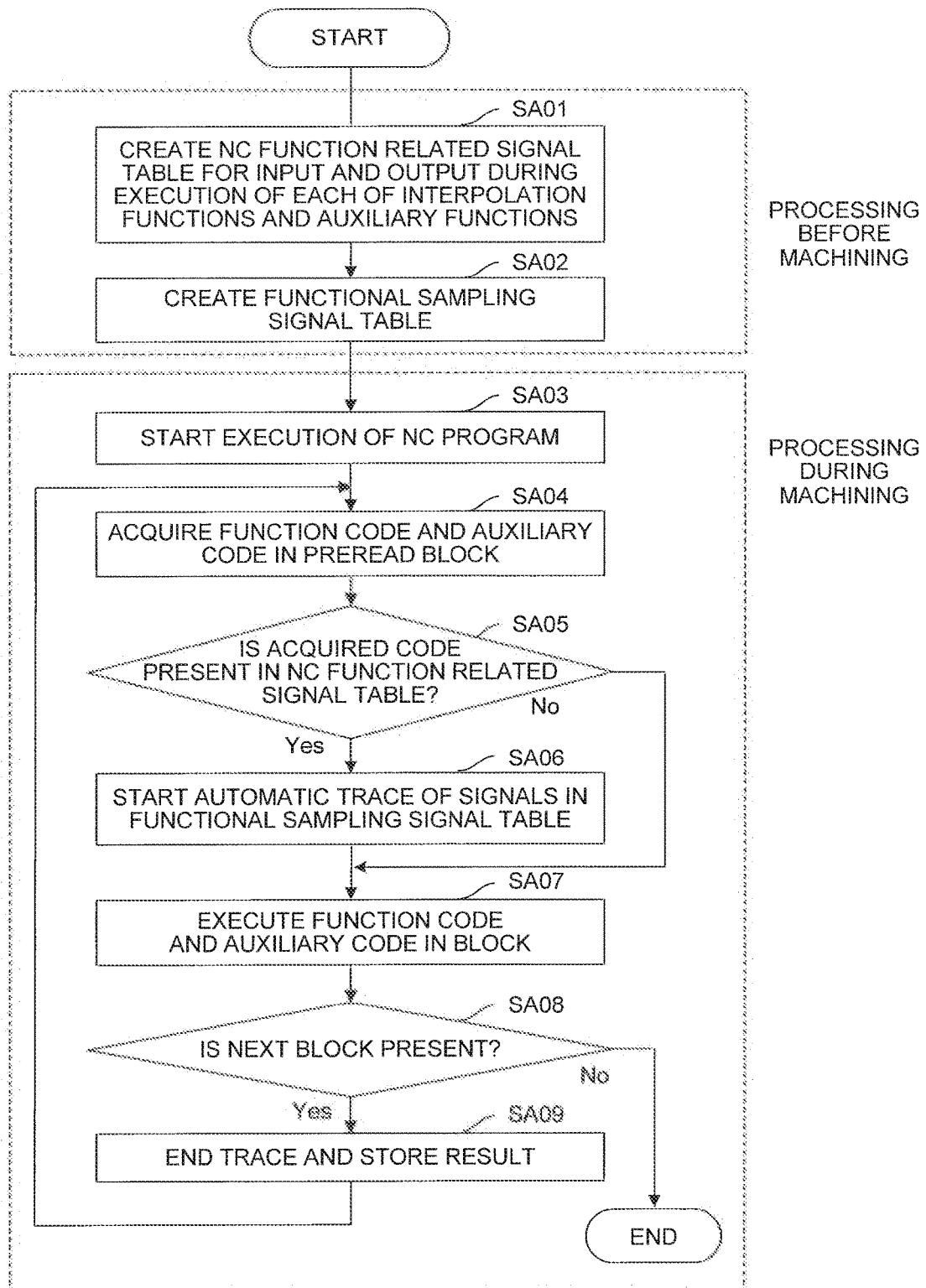

NUMERICAL CONTROLLER HAVING AUTOMATIC TRACE FUNCTION OF RELATED SIGNAL IN ASSOCIATION WITH NC PROGRAM OPERATION

BACKGROUND OF THE INVENTION

1. Field of the Invention

The present invention relates to a numerical controller and, in particular, to a numerical controller that has an automatic trace function of a related signal in association with an NC program operation.

2. Description of the Related Art

When an interpolation function or an auxiliary function of an NC program is executed, a function of outputting a particular signal (F signal) with respect to a programmable controller is available. A ladder program periodically executed in a programmable controller processes a signal from an NC and outputs a signal to the outside. Furthermore, interpolation functions and auxiliary functions of an NC program include a function of requesting a completion signal (G signal) from a programmable controller.

An operator may use a trace function with respect to the flow of a series of processing of these signals to perform debug or maintenance work of a ladder program. However, in order to find out a group of these related signals, it is necessary to check in advance related input and output signals of each of interpolation functions and auxiliary functions. Furthermore, in order to check a signal influenced by the related input and output signals of each of interpolation functions and auxiliary functions in the ladder program, it is necessary to use a cross reference function or the like to search for a signal in a dependent relation therewith.

As prior art techniques for checking a signal in a dependent relation more easily, the following functions are publicly known: a function with which, when a command that forms a ladder program is selected, cross reference information of a signal used in the command is automatically displayed (for example, Japanese Patent Application Laid-Open No. 10-293603) and a function with which a dependent relation of signals within a ladder program is automatically extracted (for example, Japanese Patent No. 5362148).

However, in order to debug the processing flow of a signal output when an interpolation function or an auxiliary function of an NC program is executed and a signal related to that signal as well as the processing flow of a signal requested by the interpolation function or the auxiliary function and a signal influenced by that signal, or in order to check for maintenance work, signals related to various functions of the NC program has to be checked in advance, and a signal influenced by that signal in a ladder program has to be checked. These procedures require considerable efforts.

SUMMARY OF THE INVENTION

The object of the present invention is to provide a numerical controller that has an automatic trace function of a related signal in association with an NC program operation.

According to the present invention, when an NC program is executed, from a related signal table for each NC function and a table that indicates a dependent relation of signals, which have been created in advance, a group of signals related to the NC program block is automatically traced.

A numerical controller according to the present invention includes a programmable controller that performs input and output of a signal based on a ladder program and performs control of a machine based on an NC program.

A first aspect of the numerical controller according to the present invention includes an NC function related signal table, a functional sampling signal table, a command analysis unit, a trace signal extraction unit, and a signal trace unit. The NC function related signal table registers therein NC function related signal data formed by associating a function code that commands a function usable in control of the machine, a code output signal that is output by the function, and a code input signal that indicates that external processing related to the function has been completed. The functional sampling signal table registers therein functional sampling signal data formed by associating the code output signal, the code input signal, and a signal in a dependent relation with the code output signal and the code input signal included in the ladder program. The command analysis unit prereads a block of the NC program and outputs a function code of a function commanded by the block. The trace signal extraction unit refers to the NC function related signal table and the functional sampling signal table based on the function code output by the command analysis unit and identifies a signal to be subjected to automatic trace during execution of the function. The signal trace unit traces the signal to be subjected to automatic trace extracted by the trace signal extraction unit.

The signal trace unit may be configured to collectively trace a plurality of blocks.

The numerical controller may further include an NC function related signal table creation unit that creates the NC function related signal table.

The numerical controller may further include a sampling signal table creation unit that creates the functional sampling signal table based on the NC function related signal table and the ladder program.

A second aspect of the numerical controller according to the present invention includes a functional sampling signal table, a command analysis unit, a trace signal extraction unit, and a signal trace unit. The functional sampling signal table registers therein functional sampling signal data formed by associating a function code that commands a function usable in control of the machine, a code output signal that is output by the function, a code input signal that indicates that external processing related to the function has been completed, and a signal in a dependent relation with the code output signal and the code input signal included in the ladder program. The command analysis unit prereads a block of the NC program and outputs a function code of a function commanded by the block. The trace signal extraction unit refers to the functional sampling signal table based on the function code output by the command analysis unit and identifies a signal to be subjected to automatic trace during execution of the function. The signal trace unit traces the signal to be subjected to automatic trace extracted by the trace signal extraction unit.

According to the present invention, when one or more blocks of NC programs are executed, a signal output by the executed block, a trace result of a signal related thereto, and a trace result of an external input signal within the functional sampling signal table changed before execution of the next block and a signal related thereto can be automatically acquired, whereby easier debug and maintenance work of the ladder program can be performed.

BRIEF DESCRIPTION OF THE DRAWINGS

These and other objects and features of the present invention will become apparent from the following description of exemplary embodiments with reference to the accompanying drawings in which:

FIG. 3 is a diagram illustrating an example of an NC function related signal table created by an NC function related signal table creation unit in the numerical controller illustrated in FIG. 2;

FIG. 4 is a diagram for explaining input and output of a signal in the numerical controller illustrated in FIG. 1;

FIG. 6 illustrates an extraction example of a signal in a dependent relation with a code output signal and a code input signal related to the function code G12.4 in the ladder program illustrated in FIG. 5;

FIG. 7 is a diagram illustrating an example of a functional sampling signal table created by a sampling signal table creation unit in the numerical controller illustrated in FIG. 2;

FIG. 8 is an example of a trace result output screen in the case of tracing signals (all signals) extracted from the functional sampling signal table in the numerical controller illustrated in FIG. 2;

FIG. 9 is an example of a trace result output screen in the case of tracing signals (signals other than intermediate signals) extracted from the functional sampling signal table in the numerical controller illustrated in FIG. 2; and FIG. 10 is a flowchart illustrating a flow of processing (processing before machining start and processing during machining) performed on the numerical controller illustrated in FIG. 2.

DETAILED DESCRIPTION OF THE PREFERRED EMBODIMENT

Figure 1:
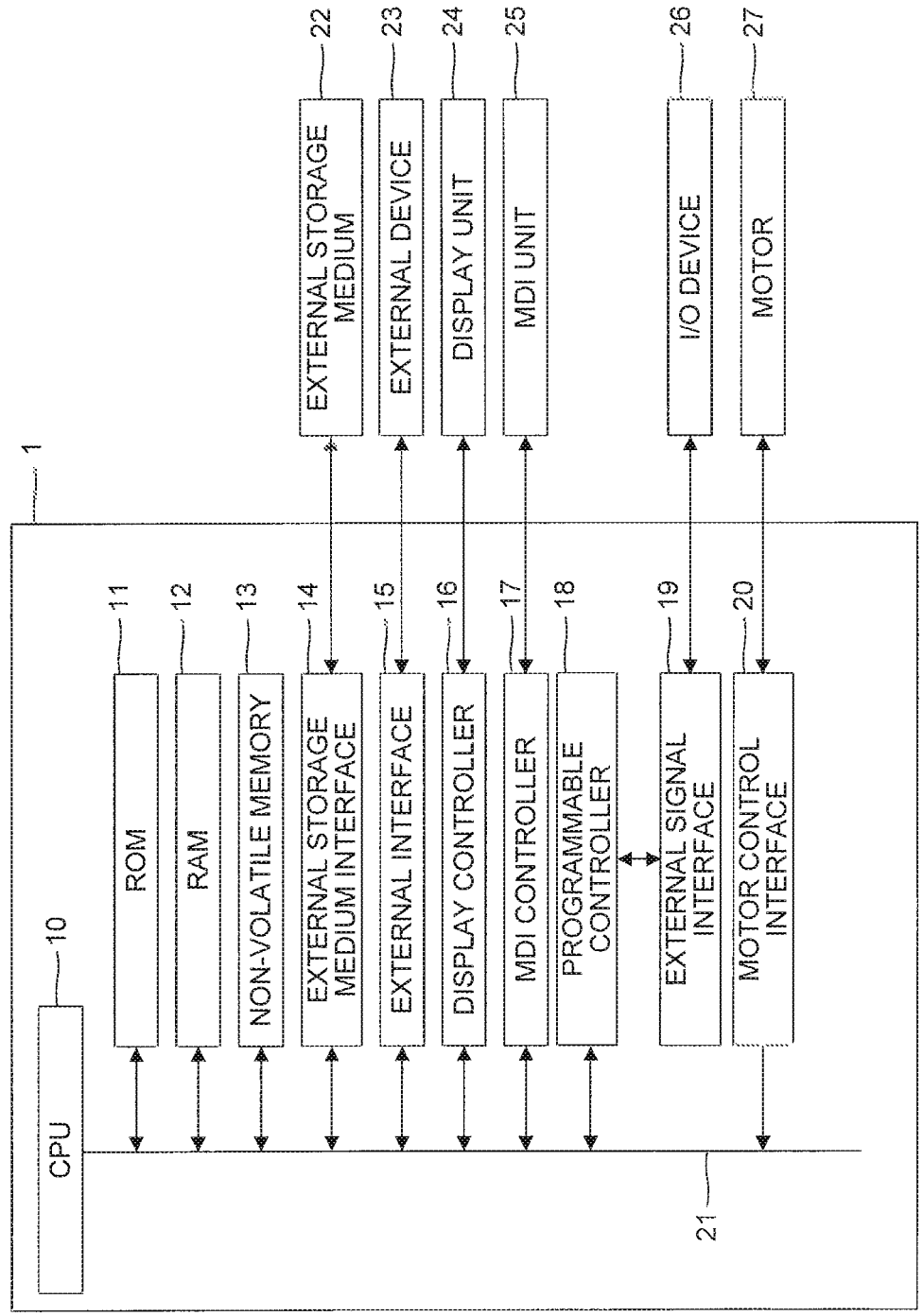
FIG. 1 is a principal block diagram of a numerical controller according to an embodiment of the present invention.

According to the present invention, each of functional means described below is provided to a numerical controller 1, whereby a problem with a prior art technique is solved.

Functional means 1: Creates an NC function related signal table that connects each function of interpolation functions and auxiliary functions, a signal output to a programmable controller when each function is executed, and an input signal indicating that external processing based on each function has been completed and holds the created table.

Functional means 2: From the NC function related signal table, searches for one or more signals in a dependent relation with a related signal of each function in a ladder program to create a functional sampling signal table.

Functional means 3: When an NC program is executed, during prereading of an NC block, if the executed NC block has an interpolation function or an auxiliary function, extracts a signal to be traced from the functional sampling signal table.

Functional means 4: Automatically traces the extracted signal from the execution start of one block of the above-described NC program until the next block is started.

Functional means 5: Enables to consider a plurality of blocks as one block and traces the blocks.

FIG. 1 is a principal block diagram of a numerical controller according to an embodiment of the present invention.

A CPU 10 is a processor that is the center of the overall control of the numerical controller 1. When the power source of the numerical controller 1 is turned on, the CPU 10 reads out a system program stored in a ROM 11 and a control program for controlling a machine via a bus 21 and stores the read system program and the control program in a RAM 12. In accordance with the system program stored in the RAM 12, the overall control of the numerical controller 1 is performed. A program of signal trace processing according to the present embodiment is also stored in the ROM 11 as a part of the system program. A control program including a floating point arithmetic command is executed to control the machine. The RAM 12 stores therein temporary calculation data, temporary display data, and the like used in the signal trace processing. A non-volatile memory 13 stores therein a tool correction amount and a parameter, for example. Signal trace data described later is also stored in the non-volatile memory 13.

An external storage medium interface 14 is an interface for performing transmission and reception of data with an external storage medium 22 and is formed of a USB memory interface and a memory card interface. The external storage medium 22 stores therein data output from the numerical controller 1 and is formed of a USB memory and a memory card, for example.

An external interface 15 is an interface for performing transmission and reception of data with an external device 23 and is formed of an Ethernet (registered trademark) interface and an RS232-C interface. The external device 23 is formed of a personal computer, for example.

A display controller 16 converts digital data such as the current position of each axis of the machine (not illustrated), an alarm, a parameter, and image data into an image signal and outputs the image signal to a display unit 24 formed of a liquid crystal display apparatus, for example. The image signal obtained by the conversion is displayed on a display screen of the display unit 24. An MDI controller 17 receives data input from an MDI unit 25 and forwards the received data to the CPU 10.

A programmable controller 18 controls the machine with a ladder program created in a ladder form. More specifically, in accordance with an interpolation function and an auxiliary function commanded by the NC program stored in the non-volatile memory 13 and the external storage medium 22, for example, the programmable controller 18 converts data into a necessary signal based on the ladder program and outputs the necessary signal to the machine and a peripheral device which are not illustrated via an external signal interface 19 and an I/O device 26. Furthermore, the programmable controller 18 receives input signals such as a signal from the machine not illustrated and a signal from an operation switch on an operation panel included in the machine via the I/O device 26 and the external signal interface 19 and a signal from a sensor device and a peripheral device, applies necessary processing on the received input signal based on the ladder program, and forwards a result of the processing to the CPU 10.

The CPU 10 analyzes a move command issued by the NC program stored in the non-volatile memory 13 and the external storage medium 22, for example, to generate move command data and drives a motor 27 attached to the machine not illustrated via a motor control interface 20 based on the generated move command data, thereby controlling the machine.

In FIG. 1, illustration of a spindle control circuit, a spindle amplifier, and an interface for manual pulse generator, for example, is omitted.

In the description below, a signal trace function executed in the numerical controller 1 that has a structure illustrated in FIG. 1 will be described.

Figure 2:
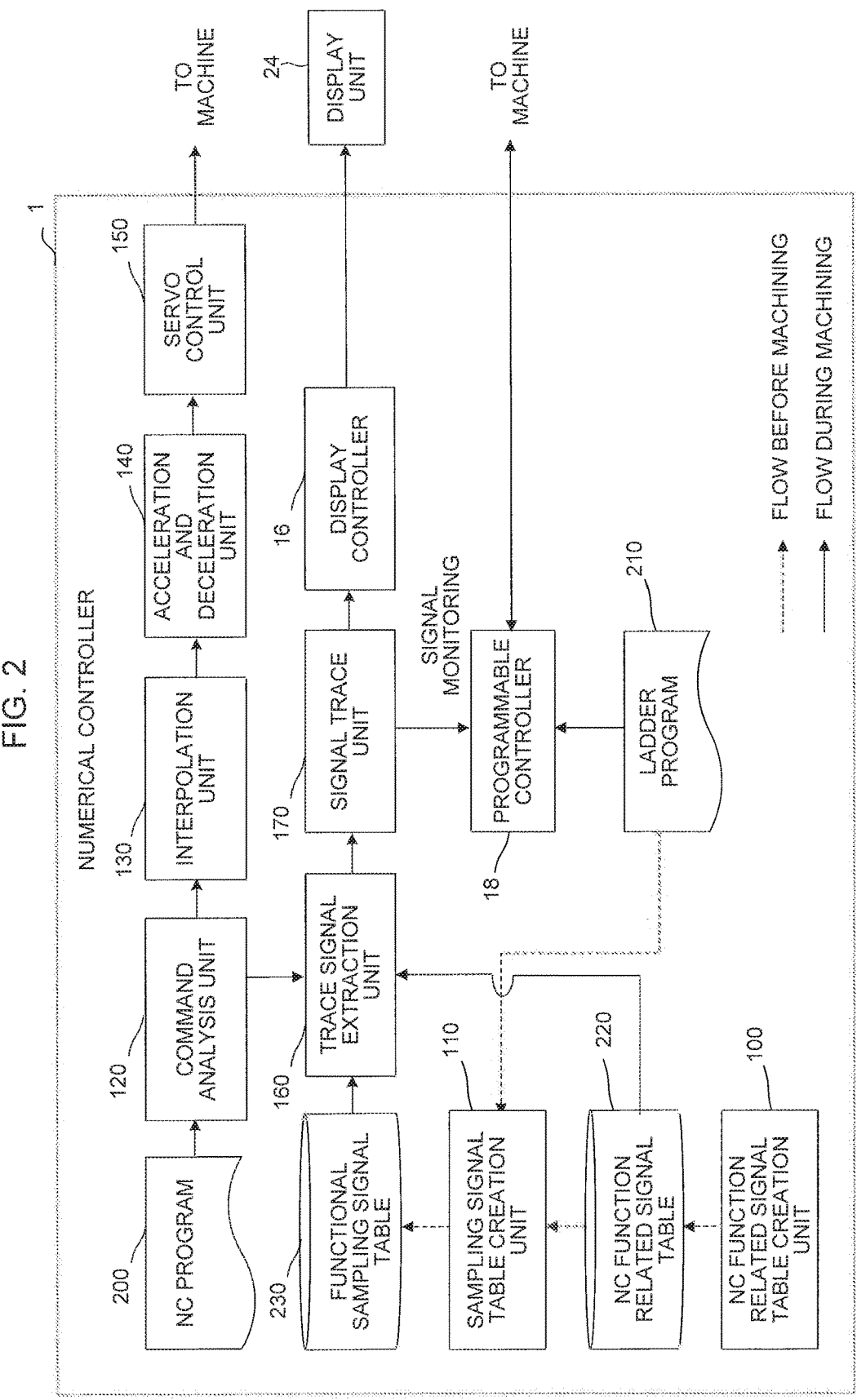
FIG. 2 is a functional block diagram of the numerical controller illustrated in FIG. 1.

FIG. 2 is a functional block diagram illustrating functions included in the numerical controller according to the present embodiment.

The numerical controller 1 includes an NC function related signal table creation unit 100, a sampling signal table creation unit 110, a command analysis unit 120, an interpolation unit 130, an acceleration and deceleration unit 140, a servo control unit 150, a trace signal extraction unit 160, and a signal trace unit 170. It should be noted that in FIG. 2, a dotted arrow represents a flow of a command or data at the time of preparation processing performed before the start of machining based on the NC program. A solid arrow represents a flow of a command or data of control processing and signal trace processing when the machining based on the NC program is started.

Firstly, the NC function related signal table creation unit 100 and the sampling signal table creation unit 110 which are operated at the time of preparation processing performed before the start of machining will be described.

The NC function related signal table creation unit 100 creates an NC function related signal table 220 that registers therein NC function related signal data formed by associating a G code and an auxiliary code (M code, S code, T code, and the like) actually used when each of the interpolation functions and the auxiliary functions is executed based on an operation of an operator, for example, a signal output to the programmable controller 18, and an input signal indicating that external processing based on each function has been completed, and stores the created NC function related signal table 220 in a memory of the numerical controller 1. This NC function related signal table creation unit 100 may be implemented as a user interface function of creating and editing the NC function related signal table 220 based on data input by an operator via the MDI unit 25, and may be implemented as a function of reading and adding the NC function related signal table 220 created by the external device 23 and the NC function related signal table 220 stored in the external storage medium 22. Furthermore, the memory storing therein the NC function related signal table 220 may be the non-volatile memory 13, and if no change is planned for the future, may be the ROM 11.

An example of the NC function related signal table 220 is illustrated in FIG. 3.

In the NC function related signal table 220, an output signal, an input signal, and a remark, for example, are registered in a manner associated with an interpolation code and an auxiliary code. The NC function related signal table 220 may be configured to register therein NC function related signal data related to all function codes and auxiliary codes, and may be configured to register therein NC function related signal data only for a designated code. Furthermore, this NC function related signal table 220 may be created in advance on the manufacturer side of the numerical controller 1, and may be added with NC function related signal data with respect to an interpolation code and an auxiliary code related to an optional function when the optional function is added afterwards, for example.

The sampling signal table creation unit 110 specifies one or more signals in a dependent relation with the related signal of each function from the NC function related signal table 220 and searches for the specified signal in a ladder program 210 to create a functional sampling signal table 230. The functional sampling signal table 230 is defined as a table that registers therein functional sampling signal data formed by associating a code output signal output to the programmable controller at the time of executing a G code and an auxiliary code (M code, S code, T code, and the like) actually used when each of the interpolation functions and the auxiliary functions is executed, an intermediate output signal and an external output signal in a dependent relation with the code output signal, a code input signal indicating that external processing based on each function has been completed, and an intermediate input signal and an external input signal with which the code input signal is in a dependent relation.

The outline of processing for creating the functional sampling signal table 230 will be described below.

In general, signals used inside the numerical controller 1 and a signal sent to/from a machine to be controlled and a peripheral device thereof include an F signal and a G signal (signals between a numerical control unit 30 within the numerical controller 1 and the programmable controller 18), an R signal (internal signal), and an X signal and a Y signal (signals sent to/from an external machine), as illustrated in FIG. 4.

Figure 5:
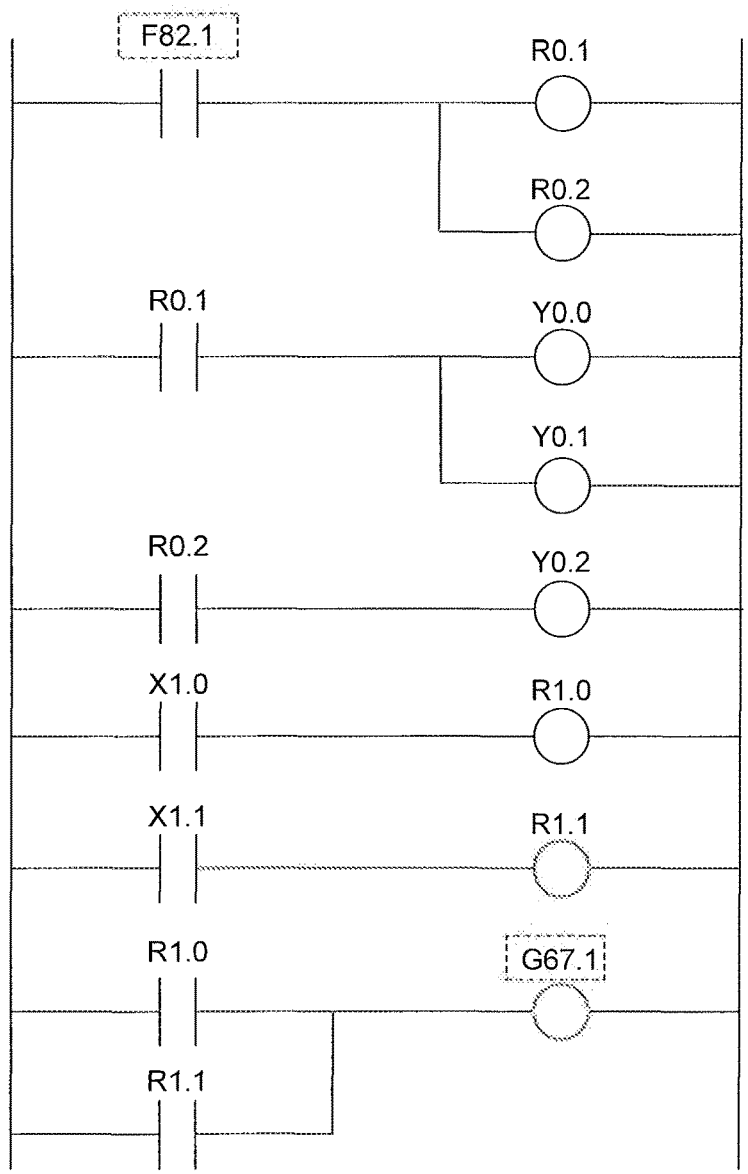
FIG. 5 illustrates an example of NC function related signal data related to a function code G12.4 stored in the numerical controller illustrated in FIG. 2 and an example of a ladder program.

FIG. 5 illustrates an example of NC function related signal data related to a function code G12.4 stored in the numerical controller 1 and an example of a ladder program.

The sampling signal table creation unit 110 searches for a contact point of a code output signal of the NC function related signal data registered in the NC function related signal table 220 and a coil of a code input signal from the ladder program 210. A contact point of a code output signal F82.1 associated with the function code G12.4 and a coil of a code input signal G67.1 are present in respective positions in dotted frames in the ladder program illustrated in FIG. 5.

Next, the sampling signal table creation unit 110 extracts a signal in a dependent relation with the code output signal and the code input signal within the ladder program 210.

As an example of the extraction method, with respect to the code output signal, a path is traced from the contact point of the code output signal in the rightward direction, thereby specifying a signal for each contact point (including a parallel contact point and a series contact point) related to the code output signal and a signal for a coil (including a parallel coil) operated in accordance with the output signal. Thereafter, a contact point of a signal related to the specified coil is searched for from the ladder program. When a contact point of that signal is present in the ladder program, the signal is extracted as an intermediate output signal. Thereafter, a path is traced from a contact point of the intermediate output signal in the rightward direction, thereby specifying a signal of each contact point (including a parallel contact point and a series contact point) related to the intermediate output signal and a coil (including a parallel coil) operated in accordance with the intermediate output signal, and a contact point of a signal related to the specified coil is searched for from the ladder program. The above-described processing is repeated until no contact point of a signal related to the specified coil is present within the ladder program, and the last specified signal is extracted as an external output signal.

By contrast, with respect to the code input signal, a path is traced from the coil of the code input signal in the leftward direction, thereby specifying a signal of each contact point (including a parallel contact point and a series contact point) related to an operation of the code input signal. Thereafter, a coil serving as a source of a signal related to the specified contact point is searched for from the ladder program. When coil serving as a source of that signal is present in the ladder program, the signal is extracted as an intermediate input signal. Thereafter, a path is traced from a contact point of the intermediate input signal in the leftward direction, thereby specifying a signal of each contact point (including a parallel contact point and a series contact point) related to the intermediate input signal, and a coil serving as a source of a signal related to the specified contact point is searched for from the ladder program. The above-described processing is repeated until no coil serving as a source of a signal related to the specified contact point is present within the ladder program, and the last specified signal is extracted as an external input signal.

FIG. 6 illustrates an extraction example of a signal in a dependent relation with a code output signal and a code input signal related to the function code G12.4 in the ladder program illustrated in FIG. 5.

In the ladder program illustrated in FIG. 5, when a path is traced from a contact point of a code output signal F82.1 in the rightward direction, a coil R0.1 and a coil R0.2 are specified. Contact points corresponding to these coils are present in the ladder program, and a signal R0.1 and a signal R0.2 are thus extracted as intermediate output signals. Next, when a path is traced from a contact point R0.1 in the rightward direction, a coil Y0.0 and a coil Y0.1 are specified. Contact points corresponding to these coils are not present in the ladder program, and a signal Y0.0 and a signal Y0.1 are thus extracted as external output signals. Similarly, a coil Y0.2 is specified with a path traced from a contact point R0.2 in the rightward direction and a contact point corresponding to that coil is not present in the ladder program, and thus a signal Y0.2 is also extracted as an external output signal.

By contrast, in the ladder program illustrated in FIG. 5, when a path is traced from a coil of a code input signal G67.1 in the leftward direction, a contact point R1.0 and a contact point R1.1 are specified. Coils corresponding to these contact points are present in the ladder program, and a signal R1.0 and a signal R1.1 are thus extracted as intermediate input signals. Next, when a path is traced from a coil R1.0 in the leftward direction, a contact point X1.0 is specified. A coil corresponding to that contact point is not present in the ladder program, and thus a signal X1.0 is extracted as an external input signal. Similarly, when a path is traced from a contact point R1.1 in the leftward direction, a contact point X1.1 is specified. A coil corresponding to that contact point is not present in the ladder program, and thus a signal X1.1 is also extracted as an external input signal.

FIG. 7 illustrates the functional sampling signal data formed by associating the intermediate output signals and the external output signals in a dependent relation with the code output signal of the function code G12.4 and the intermediate input signals and the external input signals in a dependent relation with the code input signal.

The same processing is performed with respect to each function code registered in the NC function related signal table 220 and the functional sampling signal data for each function code is created to be registered therein, whereby the functional sampling signal table 230 is created. As for a memory for storing the functional sampling signal table 230, the non-volatile memory 13 may be used, and if no change is planned for the future, the ROM 11 may be used for storing. Furthermore, the functional sampling signal table 230 may be created on the manufacturer side of the numerical controller 1 in the case of a ladder program stored in advance, and may be added on the factory side, for example, in the case of a ladder program added afterwards.

Referring back to FIG. 2, functional means operated during machining using the NC function related signal table 220 and the functional sampling signal table 230 created as described above will be described.

The command analysis unit 120 prereads a block of the NC program 200 stored in a memory, for example, and analyzes the preread block, and when there is a move command, creates a move command data and outputs the created move command data to the interpolation unit 130. Furthermore, when the preread block includes a command related to a function accompanied by output of a signal such as an interpolation function and an auxiliary function, the command analysis unit 120 outputs the function code for that command to the trace signal extraction unit 160. When a plurality of interpolation functions and auxiliary functions are present in one block, the function code of each function is output to the trace signal extraction unit 160. It should be noted that output of a code output signal and input of a code input signal to the programmable controller 18 are performed by each of the interpolation functions and the auxiliary functions, and thus omitted in FIG. 2.

The interpolation unit 130 creates data obtained from interpolation calculation of a point on a command path with an interpolation period based on a move command commanded by move command data output by the command analysis unit 120. The acceleration and deceleration unit 140 performs acceleration and deceleration processing based on the interpolation data output by the interpolation unit 130, calculates a speed of each driving axis for each interpolation period, and outputs a result of the calculation to the servo control unit 150. The servo control unit 150 then controls each driving unit of the machine based on the output from the acceleration and deceleration unit 140.

Meanwhile, the trace signal extraction unit 160 refers to the NC function related signal table 220 to determine whether the function code output from the command analysis unit 120 is registered in the NC function related signal table 220. When the function code output from the command analysis unit 120 is registered in the NC function related signal table 220, the trace signal extraction unit 160 extracts information related to a signal to be traced from the functional sampling signal table 230 based on the code output signal and the code input signal of that function code, and commands the signal trace unit 170 to trace the extracted signal. When a plurality of function codes are output from the command analysis unit 120, the trace signal extraction unit 160 extracts a signal to be traced from the functional sampling signal table 230 with respect to each of the function codes.

The trace signal extraction unit 160 can command the signal trace unit 170 to trace all or part of signals based on the setting of the operator. When the operator sets all the signals to be traced, the trace signal extraction unit 160 commands the signal trace unit 170 to trace all signals (code output signals, intermediate output signals, external output signals, code input signals, intermediate input signals, and external input signals) extracted from the functional sampling signal table 230. Furthermore, when the operator sets signals other than the intermediate signals (intermediate output signals and intermediate input signals) to be traced, the trace signal extraction unit 160 commands the signal trace unit 170 to trace each signal of the code output signals, the external output signals, the code input signals, and the external input signals extracted from the functional sampling signal table 230. Furthermore, the operator can set only output-related signals or only input-related signals to be traced, for example. It should be noted that the setting by the operator may be made from a screen of the numerical controller 1, and may be made with a code written in the NC program.

The signal trace unit 170 monitors change of a signal in the programmable controller 18, traces a signal commanded by the trace signal extraction unit 160, and stores a result of the trace in the non-volatile memory 13 and the RAM 12. Furthermore, the signal trace unit 170 causes the display unit 24 to display the signal trace result via the display controller 16 based on the command by the operator. As for the display of the signal trace result, stored data may be displayed later, or the result may be displayed in real time during machining.

FIG. 8 is an example of a trace result output screen in the case of tracing all signals extracted from the functional sampling signal table 230.

In the trace result output screen, as illustrated in FIG. 8, each signal is displayed in a manner vertically arranged with the horizontal axis serving as a time axis, or other display forms may be applicable. Furthermore, explanation in a remark acquired from the NC function related signal table 220, for example, may be displayed in a manner associated with each signal.

FIG. 9 is an example of a trace result output screen in a case where the operator sets signals other than the intermediate signals (intermediate output signal and intermediate input signal) to be traced.

As described above, based on the setting by the operator, a trace result of only necessary signals may be output.

FIG. 10 is a flowchart illustrating a flow of processing performed on the numerical controller 1 according to the present embodiment. It should be noted that in FIG. 10, steps SA01 and SA02 illustrate processing performed before machining is started, and steps SA03 to SA08 illustrate processing during machining. Each of the steps will be described below.

[Step SA01] The NC function related signal table creation unit 100 creates the NC function related signal table 220 that registers therein a signal that is input or output when each of interpolation functions and auxiliary functions is executed.

[Step SA02] The sampling signal table creation unit 110 creates the functional sampling signal table 230 based on the NC function related signal table 220 and the ladder program 210.

[Step SA03] The numerical controller 1 starts execution of the NC program 200.

[Step SA04] function code and an auxiliary code within the block preread by the command analysis unit 120 are acquired.

[Step SA05] A determination is made whether the codes acquired at step SA04 are registered in the NC function related signal table 220. When the above-described codes are registered, the procedure proceeds to step SA06. When the above-described codes are not registered, the procedure proceeds to step SA07.

[Step SA06] The trace signal extraction unit 160 extracts signals corresponding to the codes acquired at step SA04 from the functional sampling signal table 230 and the signal trace unit 170 starts automatic trace of the extracted signals.

[Step SA07] The function code and the auxiliary code of the block read at step SA04 are executed.

[Step SA08] A determination is made whether the next block is present in the NC program 200. When the next block is present, the procedure proceeds to step SA09. When the next block is not present, execution of the NC program 200 is ended.

[Step SA09] The trace of the signals performed by the signal trace unit 170 is ended, a result thereof is stored in the memory, and the procedure proceeds to step SA04.

As described above, in the numerical controller according to the present embodiment, automatic trace can be performed for all blocks of the NC program 200 that is executed. A block that has an interpolation function or an auxiliary function with no input or output signal is not registered in the NC function related signal table 220, and thus is not subjected to automatic trace. Furthermore, the operator may specify a block to enable automatic trace to be performed thereon. In this case, a block for commanding ON/OFF of automatic trace may be written in the NC program 200, and the NC program 200 may be displayed in the display unit 24 when the NC program 200 is executed so that a block to be automatically traced can be specified with the MDI unit 25 operated.

Furthermore, in a case where collective control is performed on a plurality of blocks, such as a case of very small blocks, the blocks can be treated as one block to be traced. In this case, a block for commanding ON/OFF of collective trace may be written in the NC program 200, and the NC program 200 may be displayed in the display unit 24 when the NC program 200 is executed, so that a block to be collectively traced can be specified with the MDI unit 25 operated.

Although an embodiment according to the present invention has been described above, the present invention is not limited to the example in the above-described, embodiment and may be implemented in various forms by adding appropriate modifications.

For example, in the above-described embodiment, a method is used in which a predetermined functional sampling signal table 230 is searched while prereading is performed during execution of the NC program 200. However, the NC program 200 may be analyzed before execution of the NC program 200 and a signal table for automatic trace in each block may be created in advance from a functional sampling signal table 230, so that the signal trace unit 170 performs automatic trace while referring to the signal table.

Furthermore, in the above-described embodiment, the trace signal extraction unit 160 refers to the NC function related signal table 220 to specify a code output signal and a code input signal, and refers to the functional sampling signal table 230 to extract a signal to be subjected to automatic trace. However, the functional sampling signal table 230 may be configured to include a function code, so that the trace signal extraction unit 160 refers to only the functional sampling signal table 230 to directly extract a signal to be subjected to automatic trace from the function code output by the command analysis unit 120.

The invention claimed is:
1. A numerical controller including a programmable controller that performs input and output of a signal based on a ladder program and performing control of a machine based on an NC program, the numerical controller comprising:
  a processor configured to:
    register therein NC function related signal data formed by associating a function code that commands a function usable in control of the machine, a code output signal that is output by the function, and a code input signal that indicates that external processing related to the function has been completed;
    register therein functional sampling signal data formed by associating the code output signal, the code input signal, and a signal in a dependent relation with the code output signal and the code input signal included in the ladder program;

preread a block of the NC program and output a function code of a function commanded by the block;

refer to the NC function related signal table and the functional sampling signal table based on the function code output and identify a signal to be subjected to automatic trace during execution of the function; and trace the signal to be subjected to automatic trace.

2. The numerical controller according to claim 1, wherein the processor is further configured to collectively trace a plurality of blocks.

3. The numerical controller according to claim 1, wherein the processor is further configured to create the NC function related signal table.

4. The numerical controller according to claim 1, wherein the processor is further configured to create the functional sampling signal table based on the NC function related signal table and the ladder program.

5. A numerical controller including a programmable controller that performs input and output of a signal based on a ladder program and performing control of a machine based on an NC program, the numerical controller comprising:

a processor configured to:
register therein functional sampling signal data formed by associating a function code that commands a function usable in control of the machine, a code output signal that is output by the function, a code input signal that indicates that external processing related to the function has been completed, and a signal in a dependent relation with the code output signal and the code input signal included in the ladder program;

preread a block of the NC program and output a function code of a function commanded by the block;

refer to the functional sampling signal table based on the function code and identify a signal to be subjected to automatic trace during execution of the function; and trace the signal to be subjected to automatic trace.

* * * * *